United States Patent
Nakayama et al.

(10) Patent No.: US 6,841,069 B2
(45) Date of Patent: Jan. 11, 2005

(54) HIGH RATE FILTER AND HIGH RATE FILTRATION METHOD USING THE FILTER

(75) Inventors: Yoshihiko Nakayama, Nagoya (JP); Atsushi Miyata, Nagoya (JP)

(73) Assignee: NGK Insulators, Ltd. (JP)

( * ) Notice: Subject to any disclaimer, the term of this patent is extended or adjusted under 35 U.S.C. 154(b) by 21 days.

(21) Appl. No.: 10/258,216

(22) PCT Filed: Mar. 11, 2002

(86) PCT No.: PCT/JP02/02246

§ 371 (c)(1),
(2), (4) Date: Dec. 23, 2002

(87) PCT Pub. No.: WO02/072227

PCT Pub. Date: Sep. 19, 2002

(65) Prior Publication Data

US 2004/0004036 A1 Jan. 8, 2004

(30) Foreign Application Priority Data

Mar. 13, 2001 (JP) .......................... 2001-70030

(51) Int. Cl.[7] .......................... B01D 24/26; B01D 24/46; B01D 39/04
(52) U.S. Cl. .................... 210/274; 210/275; 210/279; 210/291; 210/292; 210/293
(58) Field of Search ................................ 210/274, 275, 210/279, 291, 292, 293

(56) References Cited

U.S. PATENT DOCUMENTS 3,831,761 A * 8/1974 Chantereau ................. 210/274

FOREIGN PATENT DOCUMENTS

| JP | 56-33013 | 4/1981 |
| JP | 7-75793 | 3/1995 |
| JP | 10-118679 | 5/1998 |
| JP | 10-118681 | 5/1998 |
| JP | 2000-107785 | 4/2000 |

* cited by examiner

Primary Examiner—Minh-Chau T. Pham
(74) Attorney, Agent, or Firm—Parkhurst & Wendel, L.L.P.

(57) ABSTRACT

The present invention relates to the raw water-filtering technical field, and is to provide a high speed filtering apparatus which can filter a great amount of raw water containing suspended substances (SS) at a high concentration at a high speed. Floating filter media 2, which are composed of a foamed polymer having an apparent density of 0.1 to 0.4 g/cm$^3$ and a 50% compression hardness of not less than 0.1 MPa and have uneven shapes or cylindrical shapes with sizes of 4 to 10 mm, are charged into an up-flow type filtering tower 1. The raw water containing SS at a high concentration is filtered by passing it through the filtering tower 1 at a linear water-passing speed of 100 to 1000 m/day. While the floating filter media 2 are not compacted, a high SS-capturing percentage can be obtained. Back washing can be also effected at a high linear washing speed of 1.2 to 4.0 m/min.

7 Claims, 5 Drawing Sheets

HIGH RATE FILTER AND HIGH RATE FILTRATION METHOD USING THE FILTER

TECHNICAL FIELD

The present invention relates to a high-speed filtering apparatus for filtering a great amount of raw water containing suspended substances (hereinafter referred to as "SS") at a high concentration, such as sewage, return flow water after sludge treatment, industrial waste water, garbage-leaching solution, agricultural waste water, rainwater or the like. The invention also relates to a high-speed filtering method using said filtering apparatus.

BACKGROUND ART

When a great amount of the raw water containing the SS at a high concentration as mentioned above is to be filtered, an amount of the SS to be captured in a filtering layer needs to be increased. For this purpose, the filtration is commonly carried out in a down-flow system by using a precipitatable granular filter medium having particle diameters of around 10 mm, which is greater than those employed in an ordinary sand filtration. However, if the diameters of the filter medium are large, the SS-removing percentage inevitably decreases. Further, since the SS is captured by the entire filtering layer by back washing, there are problems in that it is difficult to discharge the SS captured, and a great amount of wash water is required in the back washing.

When an up-flow filtration system is employed, filter media made of polypropylene or polyethylene having a density of 0.9 to 0.95 g/cm$^3$ each in the form of cylindrical pieces is often used (In this application, the term "medium" means a single small piece, and the term "media" means a mass of a number of such small pieces or mediums). However, since such filter media have a small difference in density between water, there is a fear that the filter media having cylindrical forms flow out. In view of this, a screen is provided under a filter media-filled layer. In this case, the screen is clogged after being repeatedly subjected to the filtration and back washing operations, which disenables the filtration. Furthermore, it is very difficult from the standpoint of the structure of the apparatus to eliminate the clogging of the lower screen.

Further, since the screen exists during back washing, the contaminant clogging the screen cannot be discharged and removed through gaps being formed among the filtering media due to their expansion. Therefore, the filter media need to be repeatedly washed with air and water, which requires a long-time back washing step. In addition, the mesh of the screen is often generally increased to as much as 10 mm or so in order to prevent the lower screen from being clogged, the grain diameters of the filter media need to be greater than that mesh, and the thickness of the filter media needs to be larger than 2 m or so in order to enhance the SS-capturing efficiency. In this case, the apparatus unfavorably becomes very large.

DISCLOSURE OF THE INVENTION

The present invention is to solve the above-mentioned problems of the prior art, and to provide a high-speed filtering apparatus which can filter a great amount of raw water containing SS at a high concentration at a high speed and can be easily back washed and in which a screen liable to be clogged is eliminated. The invention also provides a high-speed filtering method using this filtering apparatus.

A high-speed filtering apparatus according to aspect 1, which is made to solve the above-mentioned problems, comprises an up-flow type filtering tower, and floating filter media filled inside the filtering tower, wherein the filter media comprise a foamed polymer having an apparent density of 0.1. to 0.4 g/cm$^3$ and a 50% compression hardness of not less than 0.1 MPa, and the filter media have uneven shapes or cylindrical shapes with sizes of 4 to 10 m. The apparent density is not the density of the polymer itself, but the average density of the foamed polymer including pores.

A high-speed filtering apparatus according to aspect 2 comprises an up-flow type filtering tower, and floating filter media filled inside the filtering tower, wherein the filter media comprise a foamed polymer having an apparent density of 0.1 to 0.4 g/cm$^3$ and a 50% compression hardness of not less than 0.1 MPa, and the filter media comprise first filter media having uneven shapes or cylindrical shapes with sizes of 4 to 10 and second filter media having spherical shapes with sizes of 2 to 4 mm and an apparent density of 0.03 to 0.1 g/cm$^3$.

Further, the high-speed filtering method according to the present invention is characterized by passing raw water containing suspended substance (SS) at a high concentration in an up-flow manner through either one of the above-mentioned high-speed filtering apparatuses at a linear water-passing speed of 100~1000 m/day. In this case, after the filter apparatus reaches a given differential filtering pressure, back washing may be made at a linear washing speed of 1.2 to 4.0 m/min. On the other hand, the linear water-passing speed of 1000 m/day is converted to about 0.7 m/min, which is great as corresponding to a linear washing speed in a general sand filtering apparatus. Therefore, the SS-removing efficiency extremely decreases at a linear water-passing speed more than the above, because some SS will not be captured by the filter media.

In the present invention, since the relatively hard floating filter media having uneven or cylindrical shapes and being difficult to be compacted are used, much SS can be captured among the filter media. Therefore, the great amount of raw water containing much SS at a high concentration can be filtered at a high linear water-passing speed of 100 to 1000 m/day. Further, since the floating filter media having the apparent density far smaller than those in the prior art are used, there is no fear that the floating filter media flow out during back washing. Furthermore, since a lower screen as in the prior art is unnecessary, a trouble regarding the clogging of the screen does not occur. In addition, since the filter media can be easily back washed at a linear washing speed of 1.2 to 4.0 m/min., the time for back washing can be shortened.

BEST MODES FOR CARRYING OUT THE INVENTION

In the following, preferred embodiments of the present invention will be shown.

Figure 1:
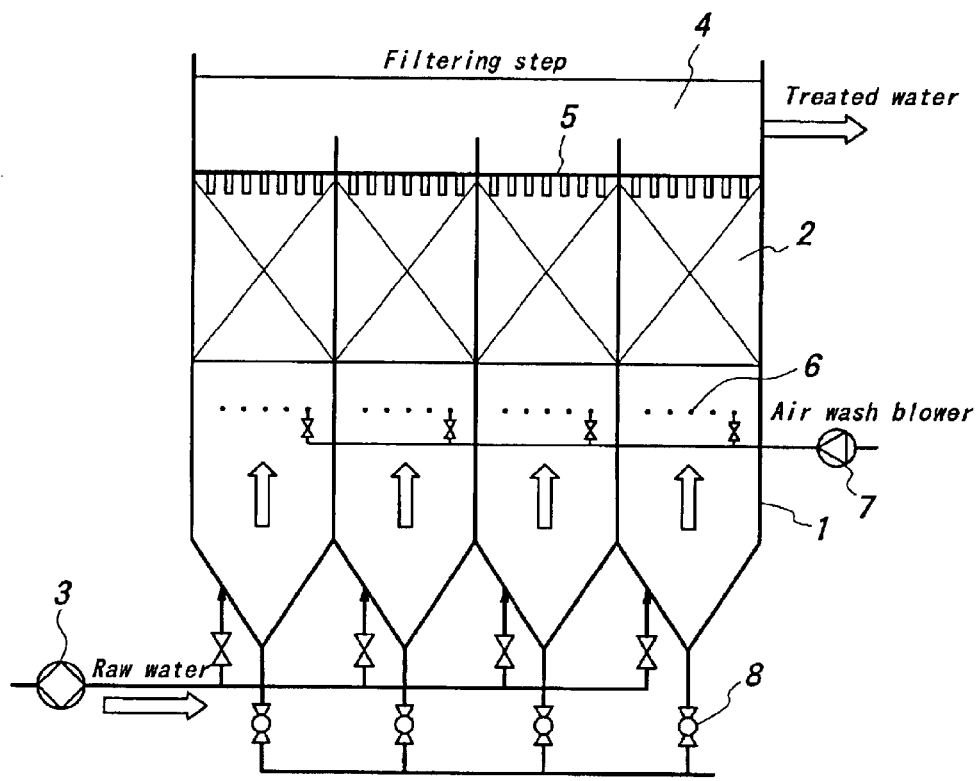
FIG. 1 is a sectional view of a high-speed filtering apparatus during filtration operation.

In FIG. 1, a reference numeral 1 denotes a filtering tower. In this embodiment, four filtering towers 1 are arranged in parallel. Floating filtering media 2 shown below are charged up to a given height inside each filtering tower 1. A large amount of raw water containing SS at a high concentration, such as sewage, return flow water after sludge treatment, industrial waste water, garbage-leaching solution, agricultural waste water, rainwater or the like is fed to a lower portion of the filtering towers 1 by means of a raw water pump 3, and the SS are captured with the floating filter media-charged layer during passing upwardly through inside the tower, and treated water is taken out through an upper common flow channel 4.

An upper screen 5 is provided above the filter media-charged layer so as to prevent outflow of the floating filter media during the filtering operation. Back washing air nozzles 6 are arranged under the charged layer so that back wash air may be fed by means of a air washing blower 7 upon necessity. In addition, discharge valves 8 are provided at lower ends of the filtering towers 1 for draining the back wash waste water.

The floating filter media 2 used in the present invention comprise a foamed polymer having an apparent density of 0.1 to 0.4 g/cm$^3$ and a 50% compression hardness of not less than 0.1 MPa. As the foamed polymer having such physical properties, polypropylene, polystyrene, polyethylene, etc. may be recited. Among them, closed cell type foamed polyethylene having a controlled foamed degree has excellent heat resistance, chemical resistance and weather resistance.

The reason why the apparent density is limited to 0.1 to 0.4 g/cm$^3$ is that if it is less than 0.1 g/cm$^3$, desired compression hardness cannot be obtained, and the filtering media layer cannot be swelled during linear back washing at 1.2 to 4.0 m/min, whereas if it is more than 0.4 g/cm$^3$, it is feared that the filter medium may flow out. The reason why the 50% compression hardness is not less than 0.1 MPa is that if it is less than 0.1 MPa, the filter media are compacted during filtering at a high speed, so that a large amount of the SS cannot be captured, which results in a shorter filtering-continuing time period. The "50% compression hardness" means a pressure required for compacting a sheet of the polymer to constitute the filter media to a half of its height. The 50% compression hardness and the apparent density are measured according to the methods specified in JIS K 6767.

Figure 3:
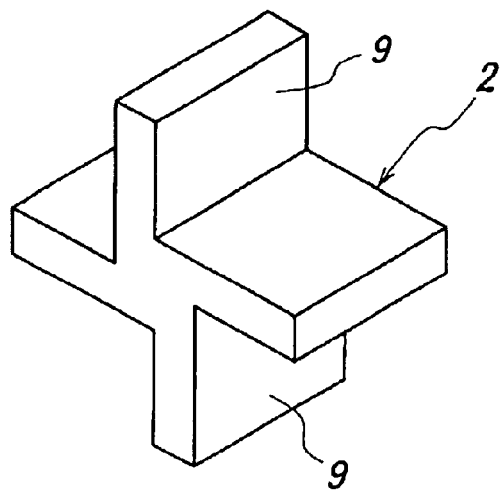
FIG. 3 is a perspective view of a floating filter medium.
Figure 4:
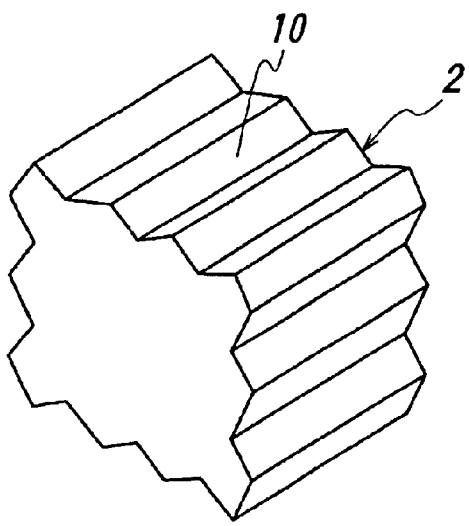
FIG. 4 is a perspective view of another floating filter medium.
Figure 5:
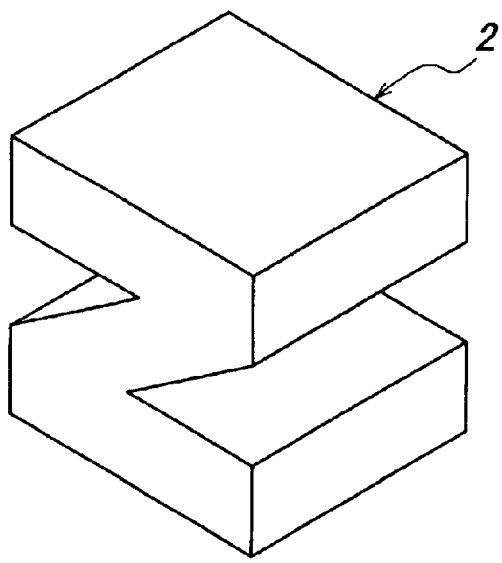
FIG. 5 is a perspective view of a further floating filter medium.
Figure 7:
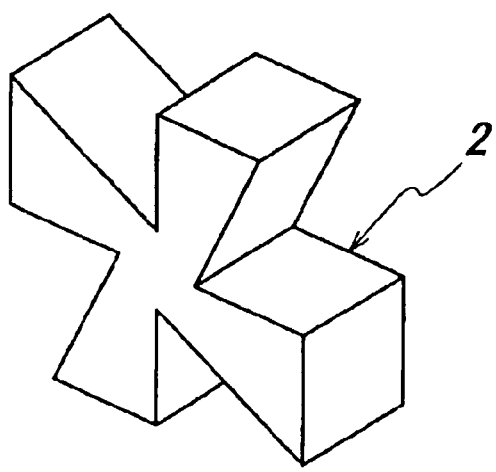
FIG. 7 is a perspective view of a windmill-shaped floating filter medium.
Figure 8:
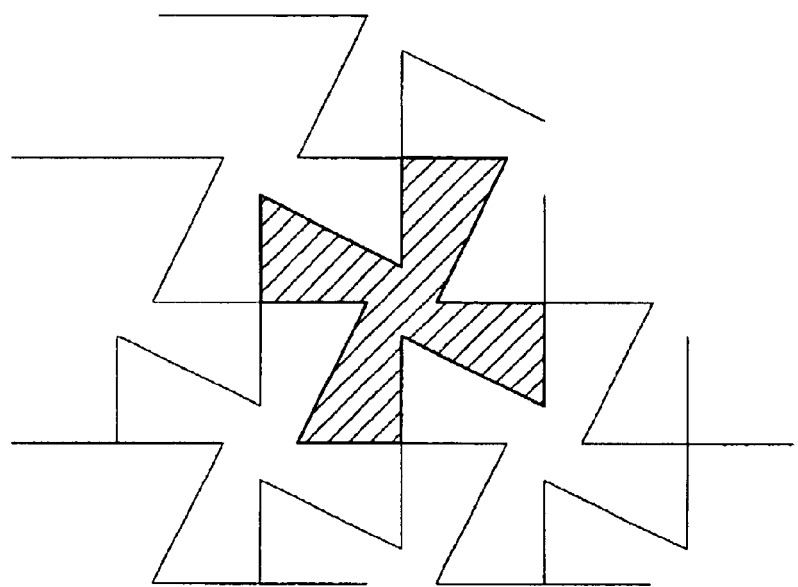
FIG. 8 is a plane view showing a punching example from a flat plate.
Figure 9:
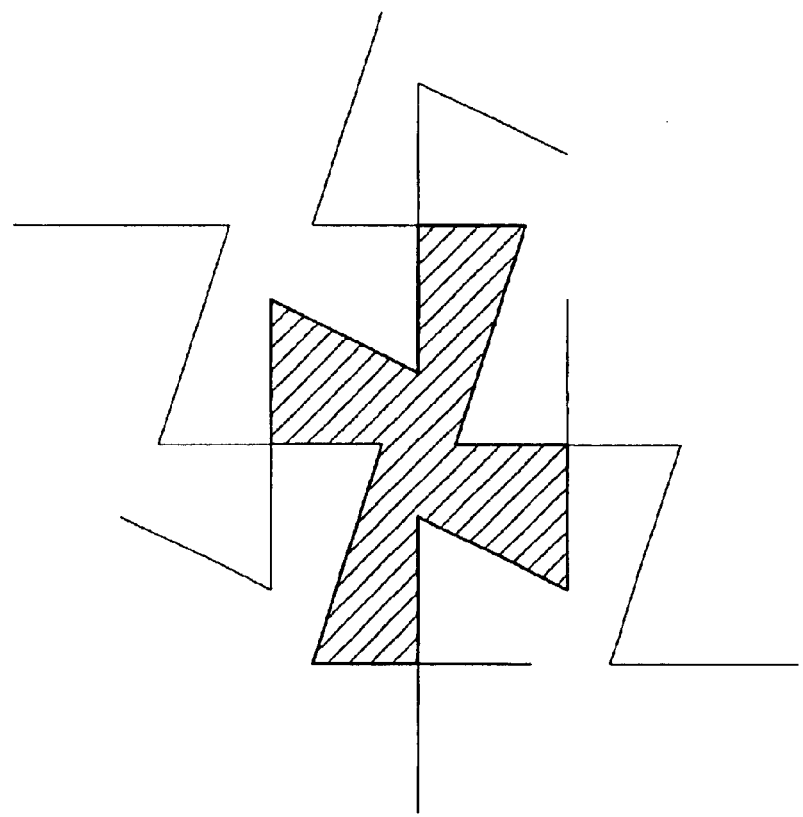
FIG. 9 is a plane view showing another punching example from a flat plate.

The floating filter medium 2 used in the present invention have uneven or cylindrical shapes with sizes of 4 to 10 mm. The uneven shape means not a simple configuration such as a cubic shape, a rectangular parallelepiped shape, a spherical shape or the like, but a foreign shape having uneven portion (s) at its outer surface. For example, FIG. 3 shows a floating filter medium 2 having four blade-shaped arms 9, FIG. 4 shows a floating filter medium 2 having wavy uneven portions at an outer peripheral sides of a rectangular-section plate. FIG. 5 shows a floating filter medium small piece 2 having a shape with a Z-section. FIG. 7 is an improvement of the configuration of FIG. 3 in which the blade portions are changed to windmill-like vanes. Preferably, the floating filter medium is designed in such a shape as allowing punching same-shape pieces from a flat plate, because no wasteful consumption of the material occurs. This is said to the shapes of FIGS. 3 and 4.

Gaps formed among the floating filter media 2 having such uneven shapes when forming the charged layer do not lead to straight paths, so that precipitating effect and filtering effect are favorably enhanced to assuredly capture the SS inside the charged layer. Since the gap among the filter media are large, there is also a merit that a large amount of the SS can be captured inside the charged layer. The shapes of the floating filter media 2 are not limited to ones illustrated in FIGS. 3 to 7 by way of example, but may be designed in other various shapes (For example, a shape having a number of projections, such as "Confeetti").

Figure 6:
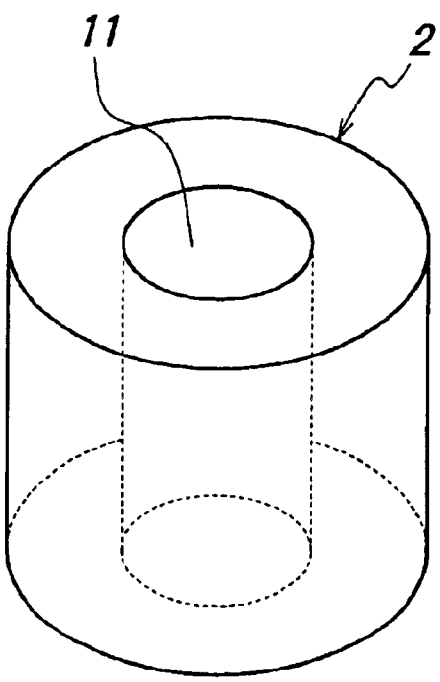
FIG. 6 is a perspective view of a cylindrical floating filter medium.

The floating filter media 2 used in the present invention may be of a shape shown in FIG. 6. This shape exhibits an effect that the SS are captured in an internal space 11 to thereby enable a large amount of the SS to be captured. The shape is not only limited to a cylindrical one shown in FIG. 6, but also may be a rectangular-section columnar shape.

The reason why the sizes of the floating filter media are set at 4 to 10 mm is that if the sizes are less than 4 mm, the filter media are likely to be clogged at a high-speed filtering, whereas if they are more than 10 mm, the SS-capturing percentage decreases. As mentioned above, since the floating filter media used in the present invention are not of simple shapes, the "size" is defined to mean the largest dimension of various outer dimensions of a single filter medium particle.

In the invention of aspect 2, the spherical filter media having an apparent densities of 0.03 to 0.1 g/cm$^3$ and particle diameters of 2 to 4 mm are charged into the filtering tower 1 together with the floating filter media 2. These spherical filter media are of polymer particles having a high foamed degree, so that they form a charged layer separately above that of the above floating filter media 2 owing to a difference in the density. Thereby, the SS-capturing percentage is further increased. Although the spherical filter media mix temporarily with the floating filter media 2 during back washing, the two kinds of the filter media are separated from each other owing to difference in the density when the back washing is stopped. As the foamed polymer having such physical properties, polypropylene, polystyrene, polyethylene, etc. may be recited. Among them, closed cell type foamed polyethylene having a controlled foamed degree has excellent heat resistance, chemical resistance and weather resistance.

When a large amount of the raw water containing a high concentration of the SS is to be filtered with the high-speed filtering apparatus as mentioned above, the raw water is fed into the filtering towers 1 from their lower portions by means of the raw water pump 3 as shown in FIG. 1, the SS are captured with the charged layer while being passed upwardly through the towers, and taken out as treated water through the upper common flow path 4. At that time, the linear water-passing speed is 100 to 1000 m/day, preferably 300 to 1000 m/day. The outflow of the filter media is prevented by the upper screens 5.

When the filtration is effected at such a high speed, a large amount of the SS can be effectively captured with the above floating filter media 2 and such a large amount of the SS can be held inside the charged layer. In addition, the floating filter media 2 are relatively hard particles having the 50% compression hardness of not less than 1 MPa, and the filter media are not compacted under pressure at the high-speed filtering, so that the filter media are not clogged. It is difficult to filter the raw water containing a high concentration of the SS at a linear water-passing speed of not less than 100 m/day in the case of using ordinary filter media, and the filter media are clogged in a short time.

Figure 2:
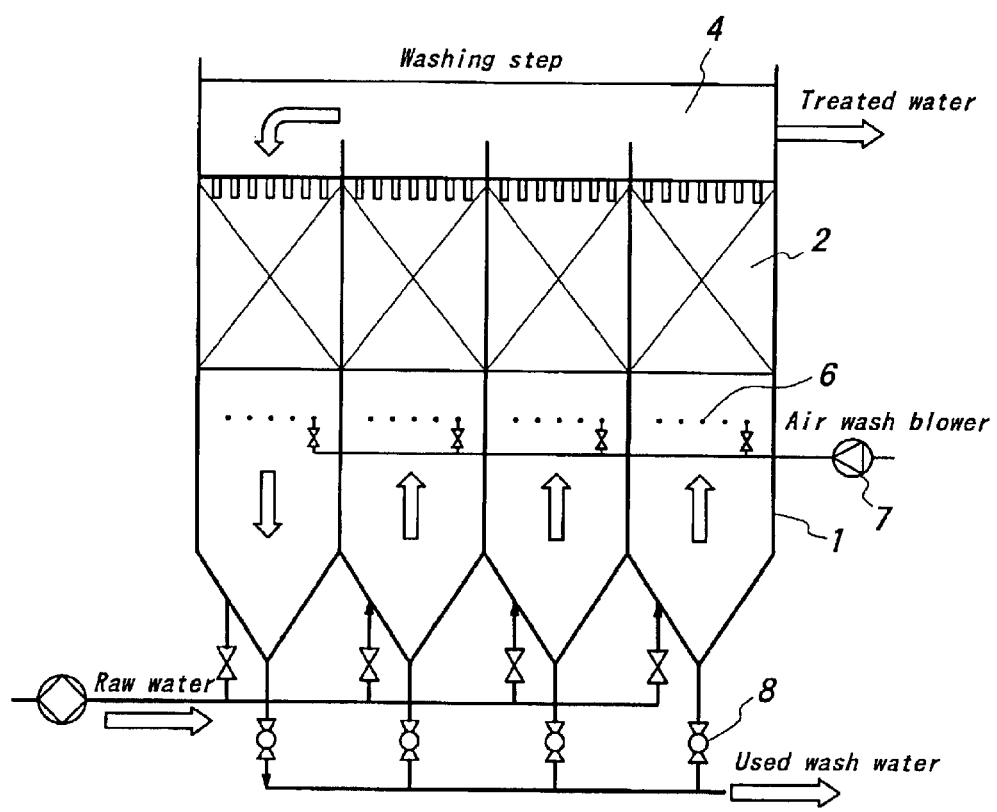
FIG. 2 is a sectional view of the high-speed filtering apparatus during back washing.

As shown in FIG. 2, when the water-passing resistance increases due to continuous filtration operation, feeding of the raw water to the filtering tower 1 having an increased water-passing resistance is stopped if necessary, and treated water inside the upper common flow channel 4 is downwardly flown therethrough by opening the discharge valve 8 for draining the used back water. At that time, air is blown into the filter media through the back washing air nozzle 6 upon necessity, so that the charged layer is vigorously stirred to separate the captured SS from the filter media. In the present invention, the linear washing speed in the back washing can be set at 1.2 to 4.0 m/min.

Since the linear washing speed is generally not more than 1.0 m/min. in back washing, the above is a considerably high-speed back washing. The reason why such a high speed back washing is possible is that the filter media do not flow downwardly outside even if no lower screen is provided, because the density of the filter media 2 is as low as not more than 0.4 g/cm$^3$. As a result, the washing time can be shortened. When the treated water inside the upper common flow passage 4 is utilized as shown in FIG. 2, the back tion of 300 mg/L was passed therethrough at a linear water-passing speed of 800 m/day, and evaluations were effected with respect to the filtration-continuing time, the SS-removed percentage and the water washability. Results are shown in Table 1. Two kinds of conventional filter media and five kinds of comparison filter media are shown in Table 1. Five kinds of invention filter media with different densities or grain diameters in the form shown in FIG. 3 were used. As the filtration-continuing time, a time period until when a differential filtering pressure rose by a water head of 1 m was measured. As shown in data of Table 1, problem(s) exist(s) with respect to the compression hardness, the filtration-continuing time period, the SS-removed percentage and/or the washability for two kinds of the conventional filter media and five kinds of the comparison examples. On the other hand, according to the invention filter media (1) to (5), necessary compression hardness, excellent SS-removed percentage, excellent washability and necessary filtration-continuing time period can be all realized.

TABLE 1

|  | | Material | Apparent specific gravity (g/cm$^3$) | Compression hardness (MPa) | ΔP1m Filtering-continuing time period (Hr) | SS-removed percentage (%) | Water-washing speed (m/minute) | Washability | Thickness of filter (m) |
|---|---|---|---|---|---|---|---|---|---|
| *Conventional | narrow cylinder ⌀13 × 13 | polypropylene | 0.9 | not less than 0.5 | 6.5 | 10 | ** | X | 1 |
|  | narrow cylinder ⌀13 × 13 | polypropylene | 0.9 | not less than 0.5 | 4.0 | 22 |  | X | 2 |
| Cubic (mm) 10 × 10 × 10 |  | foamed polyethylene | 0.05 | 0.014 | 0.5 | 47 | 2.5 | ○ | 1 |
| Cubic (mm) 10 × 10 × 10 |  | foamed polyethylene | 0.5 | not less than 0.5 | 5.0 | 40 | 0.8 | X | 1 |
| Hollow cylinder ⌀5 × 6 |  | polyethylene | 0.9 | not less than 0.5 | 1.8 | 55 | 0.4 | X | 1 |
| Cubic (mm) 3 × 3 × 3 |  | foamed polyethylene | 0.2 | 0.26 | 0.3 | 65 | 3.0 | ○ | 1 |
| Cubic (mm) 12 × 12 × 12 |  | foamed polyethylene | 0.2 | 0.26 | 10.0 | 11 | 3.0 | ○ | 1 |
| Invention filter media (1) 8 × 8 × 5 |  | foamed polyethylene | 0.2 | 0.26 | 1.5 | 60 | 3.0 | ○ | 1 |
| Invention filter media (2) 8 × 8 × 5 |  | foamed polyethylene | 0.1 | 0.10 | 1.2 | 63 | 3.0 | ○ | 1 |
| Invention filter media (3) 8 × 8 × 5 |  | foamed polyethylene | 0.4 | 0.38 | 1.6 | 59 | 3.0 | ○ | 1 |
| Invention filter media (4) 4 × 4 × 5 |  | foamed polyethylene | 0.2 | 0.26 | 0.8 | 63 | 3.0 | ○ | 1 |
| Invention filter media (5) 10 × 10 × 5 |  | foamed polyethylene | 0.2 | 0.26 | 2.5 | 40 | 3.0 | ○ | 1 |

*Screen (mesh: 10 mm) was provided in a lower portion of the filtering lower.
**Since washing was impossible with water, water was extracted in a batch system.

washing can be effected by opening or closing the valve(s) in the washing water waste line, which omits the washing pump.

As mentioned above, according to the present invention, the raw water containing a high concentration of the SS can be filtered at a high speed without being clogged, and its filtering power can be restored in a short time by back washing. Next, examples of the present invention will be explained,

EXAMPLES

Example 1

Various kinds of filter media in Table 1 were charged into identical filtering towers, raw water with SS at a concentra-

Example 2

Floating filter media having an apparent density of 0.3 and a size of 8 mm each in a form shown in FIG. 3 and a filter media having an apparent density of 0.05 g/cm$^3$ and a diameter of 3.6 mm in a spherical form were charged into the filtering tower. The charged height of the former filter media was 80 cm, and that of the latter was 20 cm. A filtering test was effected, while the raw water with the SS concentration of 300 mg/L was passed through the filtering tower at 1000 m/day. As a result, the SS-removed percentage was 70%, and the BOD-removed percentage reached 65%. The filtration-continuing time period was 45 minutes.

As explained above, the present invention can exhibit the effects that a large amount of the raw water containing the SS at the high concentration can be filtered at a high speed without compacting the filter media, the filter media can be readily back washed in a short time, and since no lower screen needs be provided, clogging as in the prior art does not occur.

Industrially Applicable Field

The high-speed filtering apparatus and the high-speed filtering method using the same according to the present invention can be used to filter a great amount of raw water containing suspended substances (SS) at a high concentration, such as sewage, return flow water after sludge treatment, industrial waste water, garbage-leaching solution, agricultural waste water, rainwater or the like. Thus, the invention has a large industrial applicable value.

What is claimed is:

1. A high-speed filtering apparatus comprising an up-flow filtering tower, and a layer of floating filter media located inside the filtering tower, wherein the filter media comprise a foamed polymer having an apparent density of 0.1 to 0.4 g/cm$^3$ and a 50% compression hardness of not less than 0.1 MPa, and the filter media comprise uneven shapes having a largest dimension 4 to 10 mm.

2. A high-speed filtering apparatus comprising an up-flow filtering tower, and floating filter media located inside the filtering tower, wherein the filter media comprise a foamed polymer having an apparent density of 0.1 to 0.4 g/cm$^3$ and a 50% compression hardness of not less than 0.1 MPa, and said filter media comprise first filter media comprise uneven shapes having a largest dimension of 4 to 10 mm and second filter media having an apparent density of 0.03 to 0.1 g/cm$^3$ and spherical shapes with sizes of 2 to 4 mm in diameter.

3. The high-speed filtering apparatus set forth in claim 1, which further comprises a treated water discharge channel and a floating filter media outflow-preventing screen located above a layer of the filter media, a back washing air nozzle located under the layer of filter media, a raw water feed path at a lower portion of the filtering tower, and a back wash water-draining discharge valve located at a lower end of the filtering tower.

4. A high-speed filtering method comprising passing raw water containing suspended substances (SS) at a high concentration in an up-flow direction at a linear water-passing speed of 100 to 1000 m/day through at least one high-speed filtering apparatus comprising:

an up-flow filtering tower, and a layer of floating filter media located inside the filtering tower, wherein the filter media comprise a foamed polymer having an apparent density of 0.1 to 0.4 g/cm$^3$ and a 50% compression hardness of not less than 0.1 MPa, and the filter media comprise uneven shapes having a largest dimension 4 to 10 mm.

5. The high-speed filtering method set forth in claim 4, further comprising back washing said high-speed filtering apparatus at a linear washing speed of 1.2 to 4.0 m/min.

6. The high-speed filtering apparatus of claim 1, wherein the filter media comprise cylindrical shapes having a largest dimension of 4 to 10 mm.

7. The high-speed filtering apparatus of claim 2, wherein the first filter media comprise cylindrical shapes having a largest dimension of 4 to 10 mm.

* * * * *